(12) United States Patent
Reese

(10) Patent No.: US 9,283,702 B2
(45) Date of Patent: Mar. 15, 2016

(54) DOOR FOR A MOTOR VEHICLE AND METHOD FOR THE PRODUCTION THEREOF

(75) Inventor: Eckhard Reese, Apensen (DE)

(73) Assignee: Daimler AG, Stuttgart (DE)

( * ) Notice: Subject to any disclaimer, the term of this patent is extended or adjusted under 35 U.S.C. 154(b) by 60 days.

(21) Appl. No.: 13/640,067

(22) PCT Filed: Mar. 3, 2011

(86) PCT No.: PCT/EP2011/001061
§ 371 (c)(1),
(2), (4) Date: Nov. 5, 2012

(87) PCT Pub. No.: WO2011/124305
PCT Pub. Date: Oct. 13, 2011

(65) Prior Publication Data
US 2013/0057018 A1 Mar. 7, 2013

(30) Foreign Application Priority Data

Apr. 10, 2010 (DE) .......................... 10 2010 014 510

(51) Int. Cl.
| B29C 45/00 | (2006.01) |
| B29C 45/14 | (2006.01) |
| B60J 5/04 | (2006.01) |
| B29L 31/30 | (2006.01) |

(52) U.S. Cl.
CPC ....... B29C 45/1418 (2013.01); B29C 45/14778 (2013.01); B60J 5/042 (2013.01); B60J 5/0481 (2013.01); B29C 2045/14213 (2013.01); B29C 2045/14442 (2013.01); B29L 2031/3002 (2013.01); Y10T 29/4998 (2015.01)

(58) Field of Classification Search
CPC .................... B29C 45/1418; B29C 45/14778; B29C 2045/14213; B29C 2045/14442; Y10T 29/4998; B29L 2031/3002; B60J 5/042; B60J 5/0481
USPC ........................... 296/146.5, 146.6, 146.8, 56
See application file for complete search history.

(56) References Cited

U.S. PATENT DOCUMENTS

| 6,301,835 | B1 * | 10/2001 | Pfeiffer et al. ................... 49/502 |
| 6,302,472 | B1 * | 10/2001 | Rahmstorf et al. ........ 296/146.5 |
| 6,536,832 | B1 * | 3/2003 | Grimm et al. .............. 296/146.6 |
| 6,974,180 | B2 * | 12/2005 | Eipper et al. .................. 296/210 |

(Continued)

FOREIGN PATENT DOCUMENTS

| DE | 100 22 360 A1 | 11/2001 |
| DE | 103 26 768 A1 | 1/2004 |

(Continued)

OTHER PUBLICATIONS

International Search Report with English translation dated Jun. 20, 2011 (six (6) pages).

(Continued)

Primary Examiner — Joseph D Pape
Assistant Examiner — Dana Ivey
(74) Attorney, Agent, or Firm — Crowell & Moring LLP

(57) ABSTRACT

A door for a motor car includes a door support with at least one metal carrier element at least partially provided with plastic. The at least one metal carrier element is formed as an internal high pressure formed part. At least one metal reinforcement part and/or support part is/are attached to the metal carrier element.

20 Claims, 5 Drawing Sheets

(56) References Cited

U.S. PATENT DOCUMENTS

| | | | |
|---|---|---|---|
| 7,449,137 B2 * | 11/2008 | Staargaard et al. | 264/267 |
| 2003/0152745 A1 | 8/2003 | Wagenblast | |
| 2007/0267889 A1 * | 11/2007 | Flendrig et al. | 296/146.6 |
| 2008/0038576 A1 | 2/2008 | Riviere et al. | |
| 2008/0238136 A1 * | 10/2008 | Fuetterer | 296/146.6 |
| 2010/0199561 A1 * | 8/2010 | Weiter et al. | 49/70 |

FOREIGN PATENT DOCUMENTS

| | | |
|---|---|---|
| DE | 10 2007 017 420 A1 | 10/2008 |
| DE | 10 2007 060 628 A1 | 6/2009 |

OTHER PUBLICATIONS

Form PCT/ISA/237 (six (6) pages).

* cited by examiner

DOOR FOR A MOTOR VEHICLE AND METHOD FOR THE PRODUCTION THEREOF

BACKGROUND AND SUMMARY OF THE INVENTION

The invention relates to a door for a motor car and to a method for production thereof.

German Patent Document DE 100 22 360 A1 discloses a door and a method for production of a door in which a door support is provided with at least one metal carrier element that can be formed in a one-part or multi-part way and which is provided at least partially with plastic. The connection point of one profile to the other profile is overmolded with plastic in order to produce a corresponding connection of the two components. The respective metal carrier element can thereby be a part formed with internal high pressure that is joined with other support parts to form a door frame structure.

U.S. Patent Document 2008/0038576 A1 discloses a tubular metal structure component formed by means of internal high pressure and on which two vertical standing elements composed of plastic are sprayed. The structural component is used in particular as a front end carrier.

German. Patent Document DE 103 26 768 A1 discloses a combined internal high pressure forming-injection molding process, by means of which a hybrid component is produced from a metal tube and plastic. German Patent Document DE 10 2007 017 420 A1 also shows an internal high pressure forming-injection molding process, wherein openings are formed in the metal carrier tube by means of a punching die. The same process can also be seen in German Patent Document DE 10 2007 060 628 A1 in which mesh-like structures composed of plastic are sprayed on a metal carrier tube in order to form a composite component.

Exemplary embodiments of the present invention are directed to a door for a motor car and a method for production thereof that are optimised with regard to the weight of the door and the integration of further function areas.

In order to create a door optimised with regard to its weight and the integration of further function areas, exemplary embodiments of the present invention provide at least one metal carrier element that is produced as an internal high pressure formed part. Indeed, such an internal high pressure formed part has the advantage that it can be designed to be exceptionally adapted to stresses so that, for example, excess material accumulations or similar can be avoided. It is instead possible with such internal high pressure formed parts to easily adapt the form and/or cross-section thereof to the force and torque pattern within the door in order to consequently avoid excess wall thicknesses or similar, which would lead to an increase in the weight of the door. Furthermore at least one metal reinforcement part and a support part are attached to the metal carrier element. This can be carried out, for example, during the internal high pressure forming—for example by hydro-clinching. Likewise, a connection can obviously also be produced between the metal reinforcement part and the support part and the corresponding metal carrier element through the plastic. The at least one metal reinforcement part and support part can thereby be reinforced according to a further embodiment of the invention through the plastic and/or attached to the metal carrier element and/or provided with at least one function area. In other words, the plastic can be used particularly advantageously to reinforce corresponding components, to attach them to others or to provide them with further function areas such as screw slots or other bracket elements, mounts or similar in order to fix for example further components such as loud speakers or similar.

A further advantageous embodiment provides that the at least one metal reinforcement part and/or support part is formed as a pultruded profile or organic sheet. Such components are extremely rigid in spite of lower weight.

A further advantage of the door according to the invention is that, due to the design of the at least one metal carrier element as an internal high pressure formed part, further functions can be integrated into the door support. A corresponding function part can be connected to the metal carrier element, for example, in the internal high pressure forming process, in which the metal carrier element is formed. In addition, during the internal high pressure forming, corresponding mounts, bracket elements or similar can be incorporated into the metal carrier element in order to create function areas for the attachment of further components or similar. In addition the hybrid construction has the further advantage that, through the combination of different materials, simultaneously light and rigid components can be produced. It is possible for example, in spite of all requirements upon load being fulfilled, to save around 1.5 kg in comparison with conventional doors. In addition the door fulfills particularly high side crash requirements through load-optimised constructions. A further advantage of such hybrid components is that plastic can be obtained at a far lower price than other metals that otherwise would have to be used for function integration, whereby this applies not only for the semi-finished product but also in production. A further advantage of plastic is that it is not prone to corrosion, unlike a multitude of other metal components.

According to a further embodiment of the invention the door support is produced in a combined internal high pressure forming and injection molding process. The internal high pressure forming and the injection molding are thereby characterised initially in that these are proven production methods that can be brought together in one installation. A considerable reduction in the manufacturing tolerances in comparison with other production methods can thus be achieved. The combined internal high pressure forming and injection molding thereby has the further advantage that only one tool is required This allows, inter alia, the cycle times, the investment costs, the space requirement for the system technology and work steps and subsequent processing steps to be spared.

According to a further embodiment of the invention the door support is connected on the outer side with an outer panelling part and on the inner side with an inner trim part facing the interior of the motor car. This shell mode of construction allows, amongst other things, a modular construction principle, so that easy adaptation of doors for different series is possible. It constitutes, after all, an extremely requirement-based and flexible possibility for producing doors.

Furthermore, it is advantageous if the at least one metal carrier element extends at least in areas along a respective lateral edge side and along a lower edge side of the door. The at least one metal carrier element formed through internal high pressure forming and provided with plastic thereby facilitates the creation of an exceptionally stable frame, to which further part components or similar can be fixed for the production of corresponding functions.

According to a further embodiment of the invention the at least one metal reinforcement part and/or support part is/are connected through hydro-clinching to the metal carrier element. The hydro-clinching can thereby be carried out preferably within the scope of the internal high pressure forming and injection molding process.

According to a further advantageous embodiment the metal carrier element has different cross-sectional forms and/or wall thicknesses over its progression. A particularly weight-favourable component form can hereby be achieved.

According to a further embodiment of the invention at least one reinforcement element and/or function part is integrated into the plastic. By integrating a reinforcement element into the plastic, a relatively weight-favourable reinforcement of the metal carrier element can thus be achieved, which for its part can be designed with corresponding weight reduction. In addition the plastic is particularly favourably suited for integrating further function parts and thus creating a simple attachment possibility for further components.

In addition it has proved advantageous if an energy absorption element, in particular a structural foam, is arranged in at least one hollow profile of the door support. Through such an arrangement of an energy absorption element it is possible to improve for example the crash behaviour of the door in a simple and advantageous way.

According to a further advantageous embodiment the metal carrier element is reinforced by at least one fibre reinforcement and/or by cables, in particular as a mesh structure in an organic sheet and/or as integrated cable reinforcement. This results in a particularly favourable stiffened metal carrier element. It is further advantageous in this connection if the fibre reinforcement and/or the cables are connected by mechanical connecting means, in particular by riveting, screws and/or slotted hydro punch rivets with the metal carrier element. This results all in all in a particularly favourable connection.

According to a further embodiment of the invention the fibre reinforcement and/or the cables is/are tensioned with the intermediary of an underlay element against the metal carrier element. This results in a particularly large format fixing of the fibre reinforcement and/or the cables to the metal carrier element.

According to a further embodiment of the invention the metal carrier element is formed from an extruded profile. This can thus be designed particularly simply and adapted to loads.

In addition it has proved advantageous if the door support or the metal carrier element is subjected to a heat treatment process after the combined internal high pressure forming and injection molding process. This heat treatment process can be carried out, for example, within the scope of a painting process—for example during cathodic immersion painting. The strength and crash-expansibility of the door support/the metal carrier element can be further improved.

According to a further embodiment of the invention a lock area of a door lock of the door can be formed by the metal carrier element. This allows a simpler or easier design and assembly of the door lock.

In accordance with an exemplary method of the present invention, the at least one metal reinforcement part and/or support part are attached in the combined internal high pressure forming and injection molding process to the metal carrier element. This simplifies the production process for the door.

Finally, it has proved advantageous if the metal carrier element and/or the metal reinforcement part and/or the support part is/are preformed before being introduced into the internal high pressure forming and/or injection molding tool. Correspondingly high degrees of forming can thus be achieved for example.

BRIEF DESCRIPTION OF THE DRAWING FIGURES

Further advantages, features and details of the invention will ensue from the following description of preferred embodiments and by reference to the drawing in which:

FIGS. 1a, 1b, 1c, 1d show a perspective view of a door support with a metal carrier element that extends in areas along the respective lateral edge sides and along a lower edge side of the door and that is connected with further metal carrier elements in the form of metal reinforcement parts and/or support parts, wherein the door support is provided at least partially with plastic, and wherein in FIGS. 1b, 1c, and 1d the respective function areas which are formed from plastic are shown in cut-outs and enlarged;

FIG. 3 shows a cut-out perspective view and a cut-out enlarged and slightly perspective partial view of the metal carrier element of the door support according to FIG. 1a;

FIG. 4 shows a front view of the metal carrier element of the door support according to FIG. 1a;

FIG. 5 shows a perspective view and detailed views of the door support of the door similarly to FIG. 1a;

Figure 15:
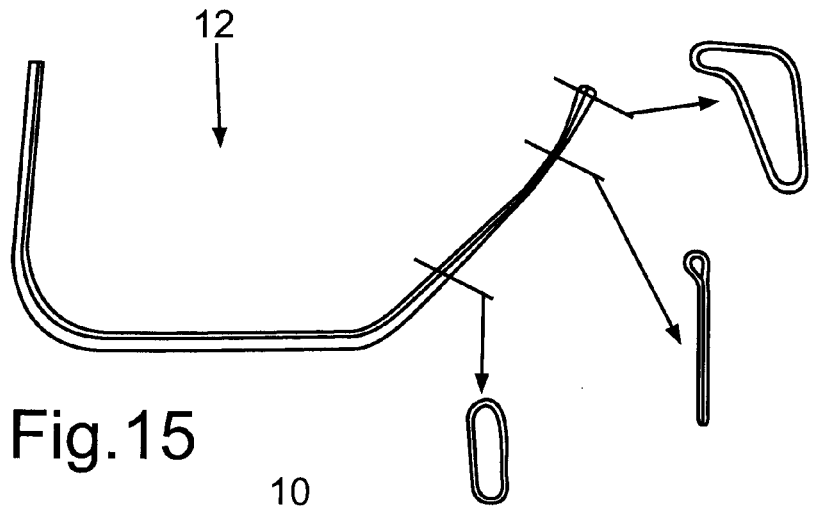
Figure 16A:
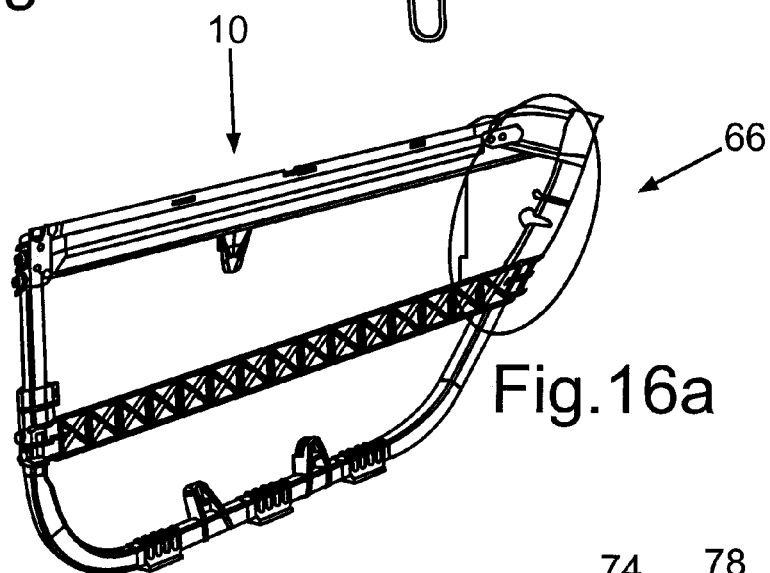

FIG. 15 shows a side view of the metal carrier element according to a further embodiment that is formed from an extruded profile that has different cross-sectional forms over its length; and FIGS. 16a, b, c show a perspective view of an alternatively designed door support, a cut-out detailed view of a lock region of a door lock of the door support and respective cut-out perspective views of the profile of the metal carrier element in the lock region of the door lock of the door support.

DETAILED DESCRIPTION

Figures 1A, 1B, 1C, 1D:
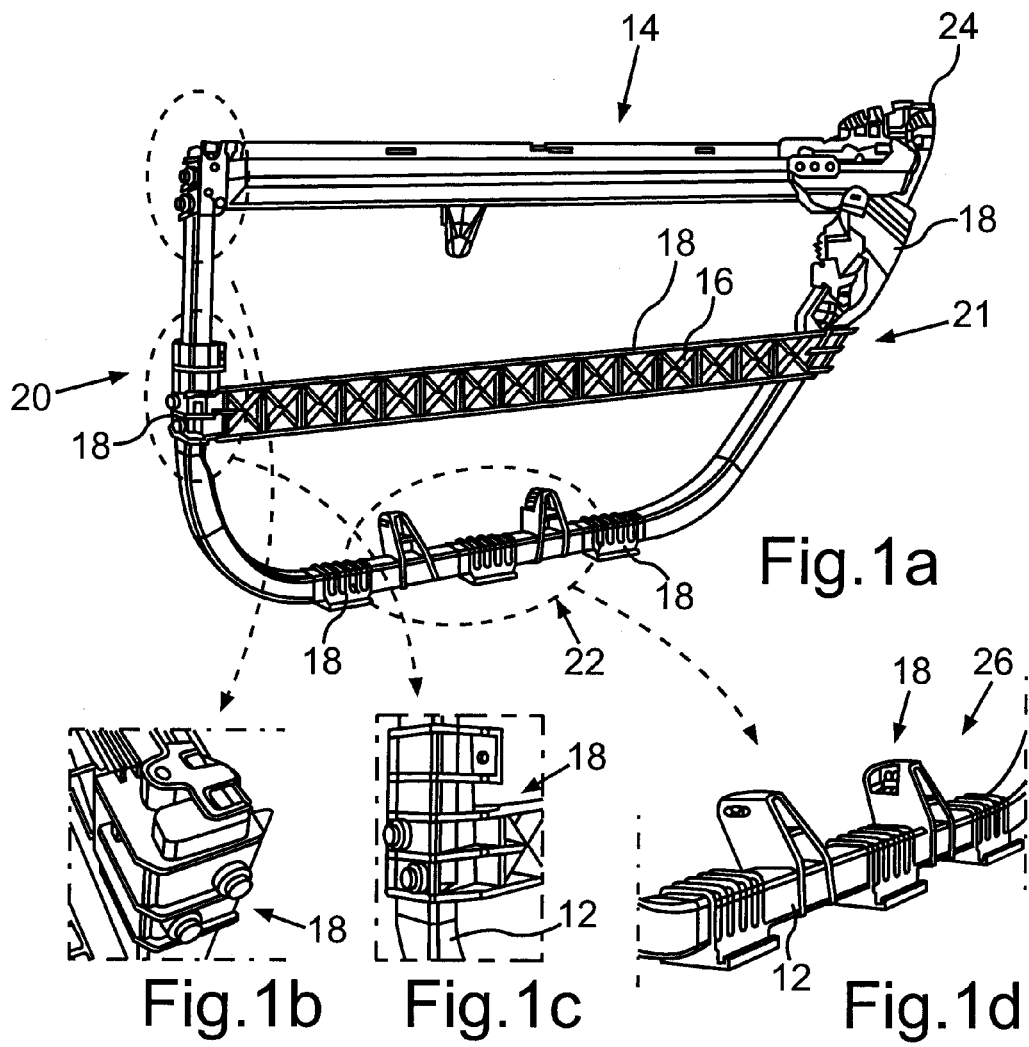

FIG. 1a shows in a slightly perspective front view a door support 10 for a side door of a motor car. The door support 10 is designed as a hybrid component and accordingly comprises initially three metal carrier elements 12, 14, 16 that are provided at least partially with plastic 18.

Figure 4:
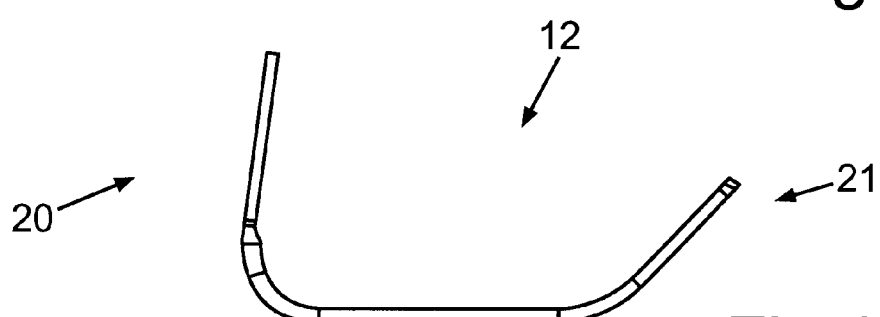

In particular, when viewed together with FIG. 4, the form of the metal carrier element 12 can be seen in the front view, extending in the present case at least in areas along a respective front or rear lateral edge side 20, 21 and along a bottom edge side 22 of the door or the door support 10. The metal carrier element 14 (i.e. the support part) is designed in multiple parts and as tubular reinforcement, which is explained in greater detail below. The metal carrier element 16 (i.e., the metal reinforcement part) is designed in the present case as a side impact support. Furthermore an inner lock plate 24 can be seen on the door support 10. The individual metal carrier elements 12, 14, 16 and the lock plate 24 consist of an aluminium alloy. Other metal or plastic materials are of course also conceivable.

When looking together at FIGS. 1*b*, 1*c* and 1*d*, one can see cut-out connection regions of the metal carrier element 12 with the metal carrier element 12, 14, which in the present case is an internal tubular reinforcement, or the metal carrier element 12 with the metal carrier element 16 formed as a side impact support and the lower region of the door support 10. According to FIG. 1*b* the plastic 18, which can be, for example, a polyamide with a glass fibre content of 60% (PA GF60), is formed as a hybrid connection node element, which connects the metal carrier element 12 to the metal carrier element 14. In addition the metal carrier element 14 is attached in a shape-locking way to the metal carrier element 12.

According to FIG. 1*c* the metal carrier element 16 is also fixed in a shape-locking way and via the plastic 18 as a hybrid connection node element to the metal carrier element 12. In addition plastic ribs are formed on the metal carrier element 16 in order to reinforce this.

According to FIG. 1*d*, function areas 26 on the lower edge side 22 of plastic 18 are provided on the lower edge region 22 of the metal carrier element 12 that serve, for example, for fixing other components or similar.

It can be provided, inter alia, that these function areas 26 are provided to fix an outer panelling part (not shown in further detail) that is attached on the outer side to the door support 10. In addition these function areas 26 can also be provided to hold an inner trim part that is arranged on the inner side of the door support 10 and faces the interior of the motor car, but cannot be recognised in the present figures. An outer tubular reinforcement cannot be seen in FIG. 1*a* either, whereby it may optionally be subsequently mounted to the outer side of the metal carrier element 14 or is attached as explained in detail below in an internal high pressure injection molding tool.

Figure 2:
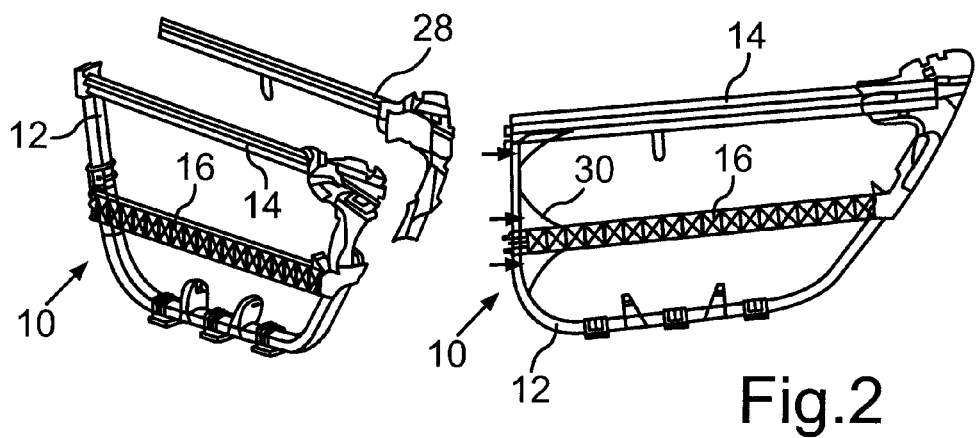
FIG. 2 shows a perspective view of the door support according to FIG. 1a in modified embodiments.
Figure 3:
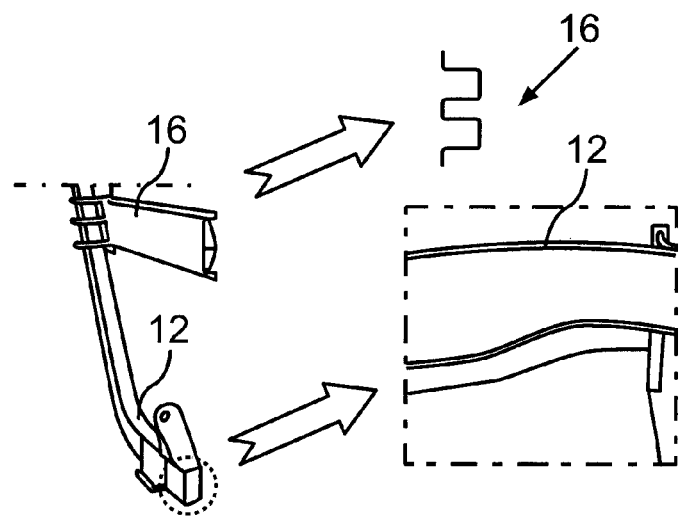

According to FIG. 2 two alternative variants of the door support 10 according to FIG. 1*a* are shown. The illustration on the left shows that an even higher rigidity of the door or the door support 10 can be achieved if, for example, steel components are used instead of the metal carrier element 14 that is formed as an inner tubular reinforcement and instead of an outer tubular reinforcement 28, which is designed according to FIG. 1*a* as aluminium components. The illustration on the right of FIG. 2 shows that a hybrid connection node element 30 made of plastic 18 between the metal carrier element 12 and the metal carrier element 16 can also be formed correspondingly widened, in the present case in a V-shape. In addition the profile geometry of the tubular reinforcement 28 and of the side impact support 16 can be correspondingly adapted in order to achieve a further improved rigidity. For example, instead of the open metal sheets, closed profiles, open or closed pultruded profiles or preformed organic sheets, optionally also mesh-reinforced organic sheets, which are also reinforced by sprayed-on plastic ribs, can be used. FIG. 3 thereby shows at the top a possible increase in the strength through a corresponding meandering cross-sectional change and a panel thickness change. At the bottom an increase in strength through a wall thickness increase and a modified profile cross-section is shown.

FIG. 4 once again shows that the metal carrier element 12 that is formed as a frame profile that comprises different cross-sectional forms in order to be designed optimally according to region and function. Conventional semi-finished tubes or tubes already adapted in cross-section and/or wall thickness (tailored tubes) can be used. In particular the metal carrier element 12 can also surround the side glass pane upwardly, thus forming a door with a frame.

Figure 5:
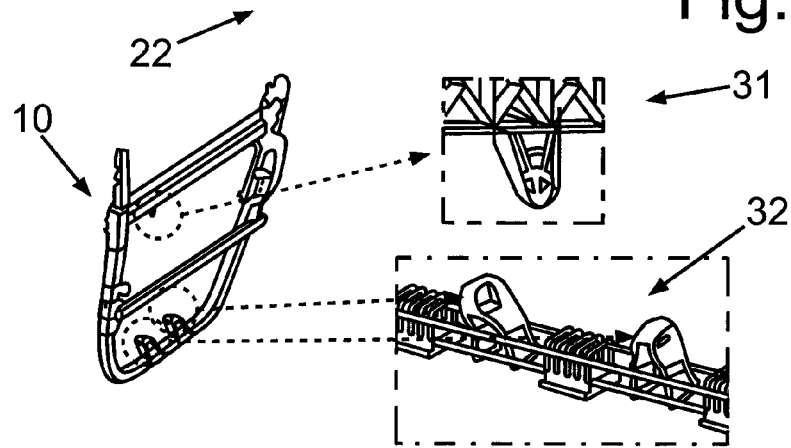

FIG. 5 shows a further perspective view and cut-out perspective detailed views according to an alternative embodiment of the door support 10. The sprayed-on plastic 18 thereby rigidifies not only the whole construction but it also allows a plurality of functions to be integrated or function areas 31, 32 to be created. The upper detailed view thereby shows, for example, a holder of a door inner grip formed from plastic 18. The lower part shows the fixing for the window lift module. Likewise, the plastic 18 can also be provided in order to hold or receive the whole inner door module including window guides, holders for electric motors, loudspeaker mounts, mirror carriers or other components and component groups.

Figure 6:
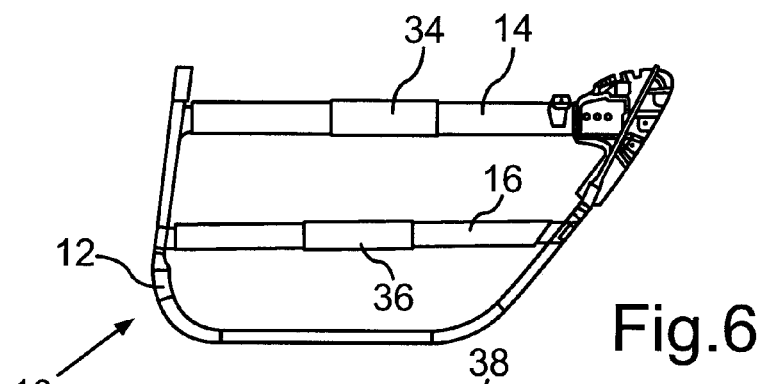
FIG. 6 shows a front view of a door support according to an alternative embodiment.

FIG. 6 shows a further alternative embodiment of the door support 10 according to FIG. 1*a*. Besides the necessary rigidity that is necessary, for example, for precisely fitting opening and closing, for sealing of the door and for guaranteeing protection from misuse, in particular the safety of occupants in case of a crash is of prime importance. Therefore, in the embodiment according to FIG. 6 both metal carrier elements 14 and 16, which are provided as tubular reinforcement or as side impact supports, are preferably formed as a hollow profile, wherein a respective energy absorption element 34, 36 is formed approximately centrally within this hollow profile. This ensures that as large a part as possible of the crash energy can be absorbed in the corresponding door or corresponding door support 10 of the body. In the present case the greater energy absorption can be achieved by completely filling the closed profiles—as shown schematically in the present case—or by locally filling at the most highly loaded point with a thermoplastic, duroplastic or metallic structural form. Besides foam reinforcements 34, 36 of the corresponding hollow profiles it is also possible to arrange energy absorption elements such as, for example, structural foams as flat cushions on other structural components, on the outer panelling part or on the inner trim part of the door. These then serve as impact cushions for occupant protection, i.e., they soften the direct contact between the door and occupant.

It is furthermore also possible to use so-called organic sheets and steel mesh structures as metal carrier elements 12, 14, 16 or as other structural components of the door support 10. Such reinforced structural elements can be attached by means of flat additional composite elements, such as clamping strips or clamping elements as well as through hydroclinching, hydro punch rivets, Pentaflow screws or Rivtac rivets as well as existing hybrid connecting node elements to the closed profile of the metal carrier element 12.

Figure 7:
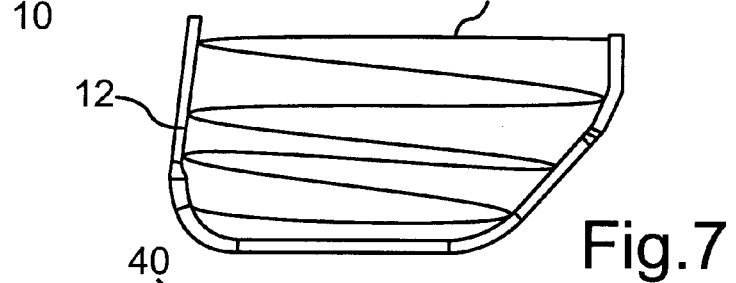
FIG. 7 shows a front view of a door support according to a further alternative embodiment.

Furthermore, FIG. 7 shows an alternative embodiment of the door support 10. Through the high crash requirements that are placed upon a side door, structure integrity and long deformation paths are also important. This can, for example, be improved through fibre composite structures, in particular organic sheets, with integrated steel cables and/or steel mesh structures as reinforcing elements. FIG. 7 shows accordingly a multitude of steel cables 38 or similar cable elements which are tensioned in particular between the front and rear edge side 20, 21 of the metal carrier element 12. In case of a crash, particularly a pole test, the forces can thus be better transferred to the door support 10 or the metal carrier element 12.

Figure 8:
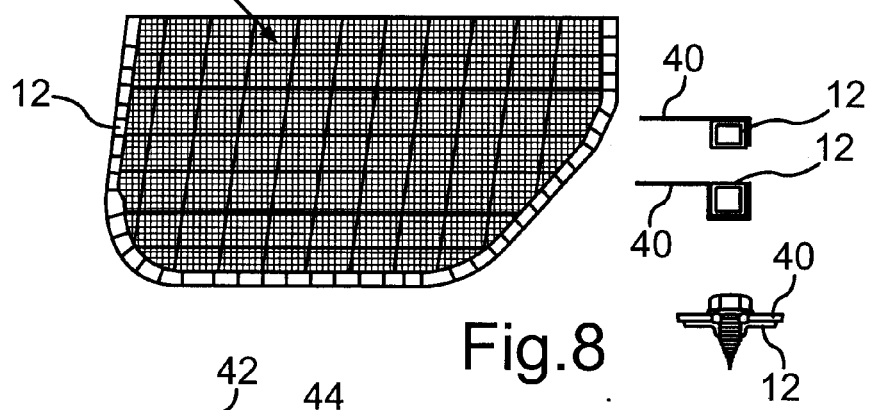
FIG. 8 shows a front view and sectional and detailed views of a door support according to a further alternative embodiment.

FIG. 8 shows an embodiment of the door support 10, in which a steel mesh structure 40 is tensioned within the metal carrier element 12.

The fibre composite structures, in particular organic sheets, into which the steel cables and/or steel mesh structures are integrated as reinforcements, preferably have a thermoplastic matrix, whereby they are thermo-deformable. Industrial textiles such as woven fabric, knitted fabric or similar can be used, which consist, for example, of protruded rowings encased with PA and metal cables/fibres. The attachment to the respective metal carrier element 12 is realised by means of a preformed edge of the fibre composite structure and/or via sprayed-on plastic ribs. The plastic ribs also reinforce the flat fibre composite structure.

The right side of FIG. 8 once again shows how the fibre composite structure with the steel mesh structure 40 is guided along the frame of the metal carrier element 12. Possibly, flow hole forming screws—as can be seen in the bottom side illustration of FIG. 8—can be used for screwing. The fixing can thereby be designed so that the fibre composite structures or steel mesh structures 40 comprise integrated fixing elements. The fixing direction can thereby be orientated in the load direction, transversely to the load direction or in all directions. One or several mesh structures 40 can thereby be integrated in the respective fibre composite material. Furthermore, the fibre composite structure or steel mesh structure 40 can be connected at points or flat to the metal carrier element 12 (FRP connection node elements or FRP connections), and indeed for example through hydro punch riveting, screwing, riveting, welding, sticking, clamping, clinching, overmolding, internal high pressure forming, hydro-clinching or similar, wherein in particular in case of metal mesh structures and organic sheets a direct or metallic flux is to be achieved.

Figure 9:
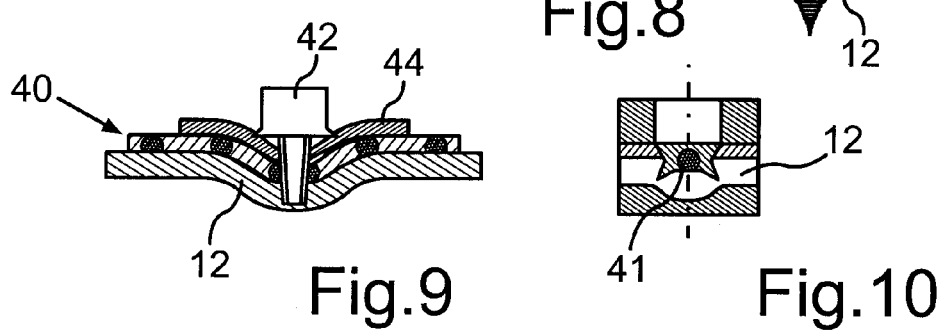
FIG. 9 shows a cut-out sectional view of a metal carrier element in the form of an organic sheet that is correspondingly connected to a corresponding metal carrier element.

Correspondingly, according to FIG. 9 a type of screwing of the organic sheet with the steel mesh structure 40 on the metal support element 12 is shown in a sectional view, wherein a screw 42 is provided which tensions, through the intermediary of an underlay element 44, the organic sheet with the steel mesh structure 40 against the metal carrier element 12.

Figure 10:
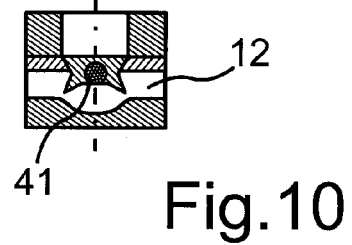
FIG. 10 shows a cut-out and symbolic sectional view of the connection of a cable with a corresponding metal carrier element.

FIG. 10 shows in contrast the connection of the steel mesh structure 40 or the cable attachment through slotted hydro punch rivets 41. A direct or metallic flux is hereby achieved particularly favourably.

Figure 11:
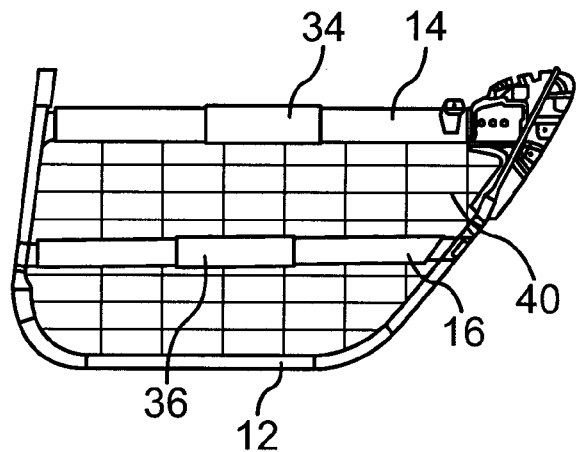
FIG. 11 shows a front view of the door support according to a further alternative embodiment.

As in a modular system, the described elements such as profiles, fibres, foams, cables or similar can be combined with each other as required in order to find the optimum compromise between costs, weight and safety according to model and specification. For example, closed profiles of organic sheets with woven-in steel cables can be additionally filled with aluminium structural foams or plastic structural foams. FIG. 11 shows a corresponding embodiment.

The production of the hybrid light construction door takes place in several steps. The main process step takes place in an internal high pressure forming-injection molding tool, wherein the metal support elements 12, 14, 16 are possibly preformed.

Figure 12:
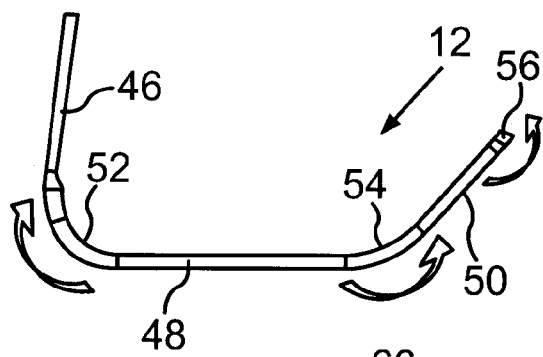
FIG. 12 shows a front view of the metal carrier element of the door support, with the aid of which the individual forming steps for producing the metal carrier element are explained.

FIG. 12 shows the metal support element 12 that is produced in a deformation tool with three pairs of die elements and two bending pivot elements. Flat pressing by means of a first die element thereby takes place in region 46; in region 48 flat pressing by means of a second die element; and in region 50 flat pressing by means of a third die element. In the corner regions 52, 54 and 56 bending—as shown by the arrows—takes place in the die.

Figure 13:
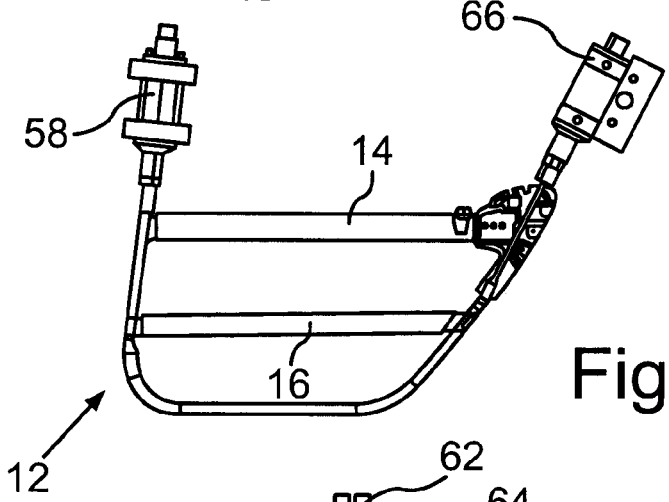
FIG. 13 shows a further front view of the door support, wherein internal high pressure formed cylinders can be seen, by means of which the metal carrier element is formed in a combined internal high pressure forming and injection molding tool and the door support is produced.

Subsequently the metal carrier element 12 and, inter alia, the metal carrier elements 14 and 16, as well as possibly the lock plate 24 and other structural parts, which preferably already have the end contour, are laid in the opened internal high pressure forming-injection molding tool. As shown in FIG. 13, the closure of the tool then takes place and respective internal high pressure forming punch elements 58, 60 at the ends of the metal carrier element 12 move into the openings thereof. The insert parts are thereby laid on the closure or ejector side of the tool. The internal high pressure molding punch elements 58, 60 are located on the nozzle side. Through the internal high pressure the profile is pressed against the cavity wall and obtains its final contour. At the same time, the insert elements—in particular the metal carrier elements 14 and 16—we connected in a shape-locking way through hydro-clinching to the metal carrier element 12.

After the internal high pressure forming process step, the plastic 18 is injected in the same tool. After a cooling phase the structural part or the door support 10 can be removed from the tool. A heat treatment of the door support 10 can then be carried out in order to improve in a cost-effective manner the properties such as for example the strength or crash stability. This heat treatment can take place for example at 200° C. and in particular at approximately 205° C. during a period of for example 30 min. Naturally, other temperatures or time periods are also conceivable.

Subsequently the further components—for example, the optically finished outer panelling part, the door lock, the inner trim part, the glass or other components and structural units—are mounted to a door module or only mounted with an outer panelling to be painted to the unfinished body of the motor car in order to be subjected together to the preliminary construction process including cathodic immersion painting, wherein in case of special aluminium alloys for panels but also for extruded profiles the strength and extension are increased.

The heat treatment can also take place, for example, within the scope of a painting process, in particular during the cathodic immersion painting (CIP). It is thereby clear that the plastic 56 must be designed to be correspondingly heat stable and suitable for CIP.

Closed profiles can be modified at the ends or joining points so that they can also be connected through hydro-clinching via double hybrid connection node elements and overmolding with the metal carrier element 12. Joining or partial joining of the individual metal carrier elements 12, 14, 16 and the lock plate 24 or other components before insertion in the internal high pressure forming-injection molding tool is also possible. When joining before the process for example a structure of tubes directly welded to each other would be possible, which would then be overmolded and injected as a tube insert in the tool. Flange connections or sleeve connections would also be possible. Partial joining would be possible, for example, sliding pipes inside each other before the internal high pressure forming process. A direct connection of the tubes would then be produced through hydro-clinching and plastic injection.

Figure 14:
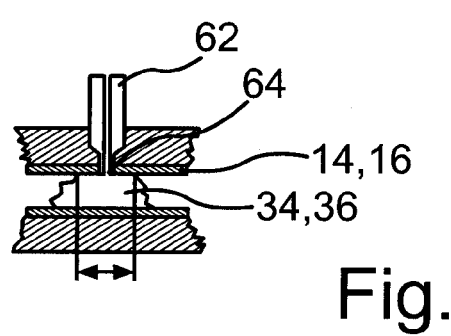
FIG. 14 shows a schematic sectional view of the metal carrier element that is filled with an energy absorption element in the form of a structural foam.

A foam reinforcement as an energy absorption element can be produced, for example, by incorporating a pre-foamed insert, through inserts incorporated at an earlier stage, which do not expand until a later point in the process, e.g., through the effects of heat, or through direct local foaming-out through pumpable foam systems. Such a method can be seen in FIG. 14 in a sectional view, wherein a foam nozzle 62 is provided that incorporates the foam into the hollow profile via an opening 64 in the corresponding structural component—for example, the metal carrier elements 14 or 16. This foaming-out through pumpable, possibly self-barrier-forming foams can be carried out outside of or within the internal high pressure forming/injection molding tool in that the foam nozzle 62 of the foam mixing head goes through the hollow structure. From structures formed in the internal high pressure forming processes, the water emulsion must firstly be drawn off before the foaming process. Flat foam layers/regions can be injected in two-component injection molding directly for the outer panelling parts or the inner trim parts. However, this can also be carried out later through separate foaming, e.g., chemically by a PUR foam.

Organic sheets with mesh structures, as described in connection with the embodiments according to FIGS. 7 to 10, can be connected in the most varied manner with the respective metal carrier element 12, 14, 16. A preferred variant is the screwing of the respective organic sheet to the metal profile according to FIG. 9 provided with an indentation. The indentation is produced in the internal high pressure forming process and the screwing can take place either also in the internal high pressure forming work or, however, also in a subsequent process. Through the indentation, a load on the screw 42 in a tensile manner is achieved instead of a shear manner. Another possibility for fixing the organic sheet in the internal high pressure forming tool is hydro punch riveting. The possibly reinforced (steel mesh or similar) organic sheet is fixed with a possibly special hollow rivet or hydro punch rivet 51, slotted for steel cables 38 or strands, or clamped between two sheets to be joined.

The attachment of one or more steel cables 38 can also take place through special hydro punch rivets 41 according to FIG. 10. Slotted hollow rivets, through which cables are guided, are used for this. The steel mesh structures 40 of the organic sheet used can comprise a fibre orientation that is horizontal, vertical or bi-directional. The steel cables can be used either as a one-part cable or as multi-part cables which are laid as a grid. The steel cable ends are correspondingly realised with the metal carrier element 12 through nipples, loops, or fixed with metal brackets. Open fixing of the cable ends or pouring into the plastic 18 is also conceivable. The steel mesh structures 40 can thereby be fixed either on a belt or also on several belts of the respective metal carrier element 12. A surrounding fixing of the steel mesh structure 40 to the respective profile of the metal carrier element 12 can also be realised. An obtuse connection or a connection with raised parts, depressions in the surrounding cable structure or a surrounding profile are also conceivable.

In sum, it can be seen that the present invention provides a door having a considerable light potential and a simplified production with associated cost reduction. By combining different materials from plastics and metal it is possible at the same time to produce light and rigid components. The targeted use of plastic saves cost-intensive aluminium. The internal high pressure forming method allows the adaptation of the aluminium or steel profile cross-section at any point according to desired function (high flexural strength, torsional rigidity, joining point, etc.). At the same time it is possible to fix through hydro-clinching and additional overmolding with plastic panels that additionally act to rigidify or have other functions such as door lock incorporation. The plastic 18 injected after the internal high pressure forming in the same tool can both rigidify the metal elements or act as a further function element. Through the great design freedom of the base material the function areas can be optimally adapted to the construction space. The use of aluminium and plastic fulfils the requirements of corrosion protection without further measures.

The use of—possibly reinforced (metal network structures)—organic sheets offers additional light construction potential through the high specific rigidity of fibre composite material and the possibility of adapting the fibre orientation to a certain extent according to load.

The performance of the aforementioned work steps in only one tool reduces cycle times, investment costs, space requirement for the production technology and—through the saving of work steps, subsequent handling and the high degree of automation—the production costs. In addition, the internal high pressure forming process and the plastic injection molding process are proven processes that can be brought together in one installation. By way of a further advantage the considerable reduction of the manufacturing tolerances in comparison with other manufacturing methods are to be indicated.

FIG. 15 shows an alternative embodiment to FIG. 12 of the metal support element 12 in a side view, which is formed from an extruded profile. This has different cross-sectional forms over its length. The various cross-sectional forms thereby have the same scope.

Figure 16C:
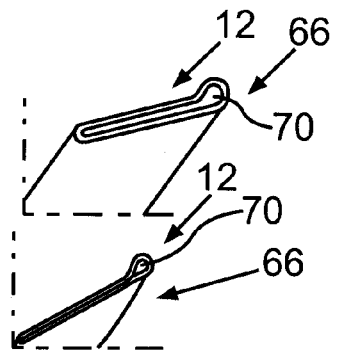
Figure 16B:
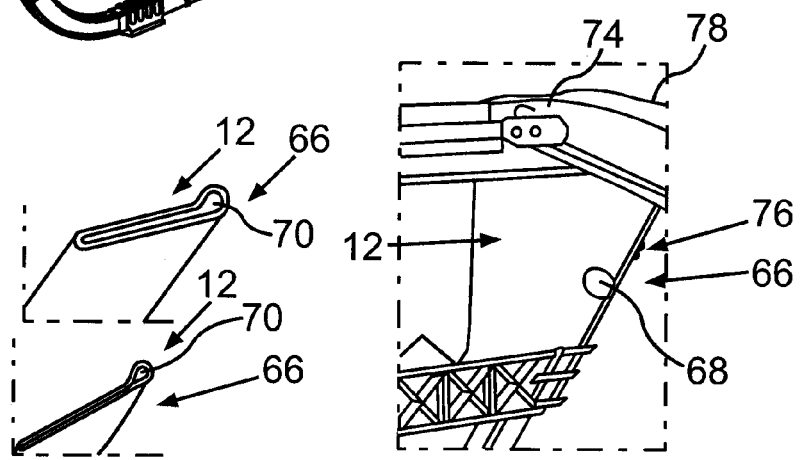

FIGS. 16a, 16b and 16c show in a further perspective view an alternatively designed door support 10, a cut-out detailed view of a lock region 66 of a door lock of the door support 10 and respective cut-out perspective views of the profile of the metal carrier element 12 in the lock region 66 of the door lock of the door carrier 10. It can be seen that a separate lock reinforcement plate can be omitted by correspondingly machining the metal carrier element 12 in the lock area 66.

After overmolding with plastic 18 the profile of the metal carrier element 12 is thereby correspondingly deformed according to FIG. 16c—for example, through internal high pressure forming flat pressing—and three bores for door lock fixture or a release element 88 for the rotary latch of the door lock are incorporated. A region 70 for flow-through with the water emulsion in the internal high pressure forming process can thereby be seen in FIG. 16c.

FIG. 16b shows internal high pressure formed connections 72 and press-in sockets 74. Furthermore, corresponding rib structures 76 for the door lock can be seen. The whole process thereby takes place in a combined internal high pressure forming and injection molding process (one-shot).

Finally it should be noted that in the combined internal high pressure forming and injection molding process (one-shot) explained according to FIG. 12, the metal carrier element 12 and the metal carrier elements 14 and 16, as well as optionally the lock plate 24 and other structural parts, are connected to each other, preferably through active or passive hydro-clinching. Connections and further joints—for example, for tubular reinforcements, etc., can also be provided. These tubular reinforcements can also consist of optionally reinforced organic sheets. This also applies to the metal support elements 14 and 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:
1. A door for a motor car, the door comprising:
  a door support including at least one internal-high-pressure-formed metal carrier element, a part of which is surrounded by a plastic, wherein
    a support part is connected to the internal-high-pressure-formed metal carrier element; and
    at least one metal reinforcement part is coupled to opposite ends of the at least one internal-high-pressure-formed metal carrier element.

2. The door according to claim 1, wherein the door support has structural features of a door support manufactured in a combined internal high pressure forming and injection molding process.

3. The door according to claim 1, wherein the door support is connected on an outer side with an outer paneling part and on an inner side with an inner trim part facing an interior of the motor car, via a plastic piece.

4. The door according to claim 1, wherein the plastic includes at least one reinforcement element or function part.

5. The door according to claim 1, further comprising:
an energy absorption element arranged in at least one hollow profile of the door support.

6. The door according to claim 5, wherein the energy absorption element is a structural foam.

7. The door according to claim 1, further comprising:
a lock region of a door lock of the door that is structurally configured to span through the internal-high-pressure-formed metal carrier element.

8. The door according to claim 1, wherein
the internal-high-pressure-formed metal carrier element has a u-shape that substantially corresponds to a shape of the door defined by lateral and bottom edges of the door, and
the support part is substantially parallel to: i) the at least one metal reinforcement part, and ii) a portion of the internal-high-pressure-formed metal carrier element.

9. The door according to claim 8, wherein the internal-high-pressure-formed metal carrier element has, along a length thereof, regions with different cross-sectional profiles.

10. The door according to claim 9, wherein the internal-high-pressure-formed metal carrier element has, along a length thereof, regions with different thicknesses.

11. The door according to claim 10, wherein the location of the regions with different cross-sectional profiles and the location of the regions with different thicknesses correspond to locations on the door having different force and torque patterns applied thereto.

12. The door according to claim 1, wherein the at least one metal reinforcement part is coupled to opposite ends of the at least one internal-high-pressure-formed metal carrier element to thereby prevent motion of the opposite ends relative to one another.

13. A method for producing a door for a motor car, the method comprising:
forming at least one metal carrier element of a door support using an internal high pressure forming process;
surrounding part of the at least one metal carrier element with plastic;
attaching a support part to the at least one metal carrier element; and
coupling at least one metal reinforcement part to opposite ends of the at least one metal carrier element.

14. The method according to claim 13, further comprising:
subjecting the door support to a heat treatment process after a combined internal high pressure forming and injection molding process.

15. The method according to claim 13, wherein
in the step of forming, the at least one metal carrier element is formed into a u-shape that substantially corresponds to a shape of the door defined by lateral and bottom edges of the door, and
the support part is formed into a shape that is substantially parallel to: i) the at least one metal reinforcement part, and ii) a portion of the internal-high-pressure-formed metal carrier element.

16. The method according to claim 15, wherein the step of forming, the at least one metal carrier element is formed to have regions with different cross-sectional profiles along a length thereof.

17. The method according to claim 16, wherein the step of forming, the at least one metal carrier element is formed to have regions with different thicknesses along a length thereof.

18. The method according to claim 17, further comprising:
determining the location of the regions with different cross-sectional profiles and the location of the regions with different thicknesses, based on different force and torque patterns applied to the door.

19. The method according to claim 13, wherein the at least one metal reinforcement part is coupled to opposite ends of the at least one metal carrier element to thereby prevent motion of the opposite ends relative to one another.

20. A door for a motor car, the door comprising:
a door support including at least one internal-high-pressure-formed metal carrier element, a part of which is surrounded by a plastic, wherein
a support part is connected to the internal-high-pressure-formed metal carrier element; and
at least one metal reinforcement part is coupled to opposite ends of the at least one internal-high-pressure-formed metal carrier element, to thereby prevent motion of the opposite ends relative to one another.

* * * * *